(12) United States Patent
Hunter

(10) Patent No.: US 8,888,139 B2
(45) Date of Patent: Nov. 18, 2014

(54) METAL HOSE END FITTING

(75) Inventor: William Hunter, Cumming, GA (US)

(73) Assignee: American BOA Incorporated, Cumming, GA (US)

( * ) Notice: Subject to any disclaimer, the term of this patent is extended or adjusted under 35 U.S.C. 154(b) by 102 days.

(21) Appl. No.: 13/252,490

(22) Filed: Oct. 4, 2011

(65) Prior Publication Data
US 2013/0082461 A1 Apr. 4, 2013

(51) Int. Cl.
*F16L 33/26* (2006.01)
*F16L 33/207* (2006.01)

(52) U.S. Cl.
CPC .............. *F16L 33/2076* (2013.01); *F16L 33/26* (2013.01); *Y10S 285/903* (2013.01)
USPC .......... 285/242; 285/222.5; 285/256; 285/903

(58) Field of Classification Search
USPC ........... 285/222.1–222.5, 242, 256, 382, 903, 285/233–234, 334.5
See application file for complete search history.

(56) References Cited

U.S. PATENT DOCUMENTS

| | | | |
|---|---|---|---|
| 944,877 A | 12/1909 | Koschinski | |
| 1,098,294 A | 5/1914 | Patty | |
| 2,113,211 A * | 4/1938 | Lake | 285/222.5 |
| 3,008,737 A * | 11/1961 | Longfellow | 285/222.5 |
| 3,191,975 A | 6/1965 | La Marre et al. | |
| 3,224,794 A | 12/1965 | Crissy | |
| 3,574,354 A * | 4/1971 | Mischel | 285/16 |
| 4,095,826 A | 6/1978 | Borradori | |
| 4,437,691 A * | 3/1984 | Laney | 285/353 |
| 4,498,691 A | 2/1985 | Cooke | |
| 4,564,223 A | 1/1986 | Burrington | |
| 5,011,196 A | 4/1991 | Sabatier et al. | |
| 5,096,231 A | 3/1992 | Chisnell et al. | |
| 5,140,738 A | 8/1992 | Pinkerman, Jr. | |
| 5,190,323 A | 3/1993 | Oetiker | |
| 5,317,799 A | 6/1994 | Chapman et al. | |
| 5,374,085 A | 12/1994 | Beatrice et al. | |
| 5,638,869 A | 6/1997 | Zaborszki et al. | |
| 5,653,475 A | 8/1997 | Scheyhing et al. | |
| 6,092,274 A | 7/2000 | Foti | |
| 6,099,046 A * | 8/2000 | Oh | 285/354 |
| 6,260,584 B1 | 7/2001 | Foti | |
| 6,378,914 B1 * | 4/2002 | Quaranta | 285/256 |
| 6,435,567 B2 * | 8/2002 | Kikumori et al. | 285/319 |
| 6,447,017 B1 | 9/2002 | Gilbreath et al. | |
| 6,860,522 B1 | 3/2005 | Spiegler | |
| 7,055,868 B2 * | 6/2006 | Watanabe | 285/249 |
| 7,063,357 B1 | 6/2006 | Bay | |
| 7,066,497 B2 | 6/2006 | Fullbeck et al. | |
| 7,624,504 B2 | 12/2009 | Watanabe | |
| 7,661,720 B2 | 2/2010 | Nakana et al. | |
| 2010/0156095 A1 | 6/2010 | Inoue | |
| 2010/0308575 A1 | 12/2010 | Rodenburg | |

* cited by examiner

*Primary Examiner* — Aaron Dunwoody
*Assistant Examiner* — Fannie Kee
(74) *Attorney, Agent, or Firm* — Robert M. Schwartz

(57) ABSTRACT

A pressure tight, high pressure metal hose fitting is provided for a corrugated metal hose formed from metal tube having the fitting crimped permanently to the end of the hose. The fitting includes a first end with a stem which has threading to be coupled to an appropriate fitting surface. The fitting also has a second end adapted to be received within the hose. A sealing gasket is disposed on the second end of the fitting. A clamshell element is disposed above and about the fitting and the hose. The fitting includes projections which are adapted to be received in the clamshell assembly. A crimping ferrule is placed above and about the clamshell and is crimped to compress the clamshell about the fitting and hose and causes the sealing gasket to form a pressure tight seal.

10 Claims, 6 Drawing Sheets

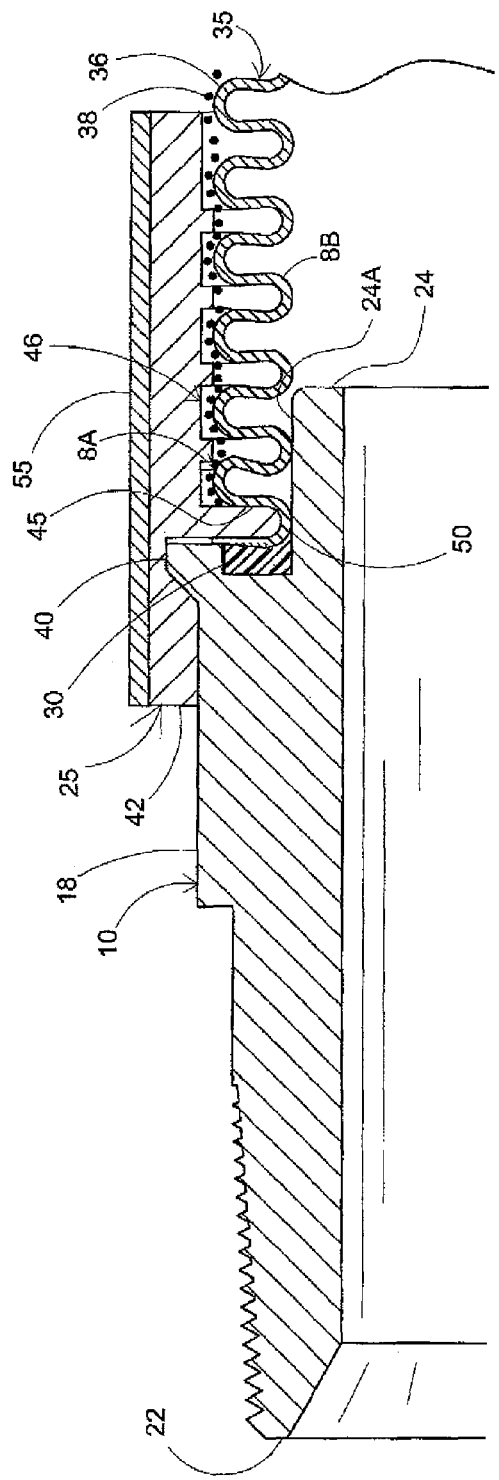
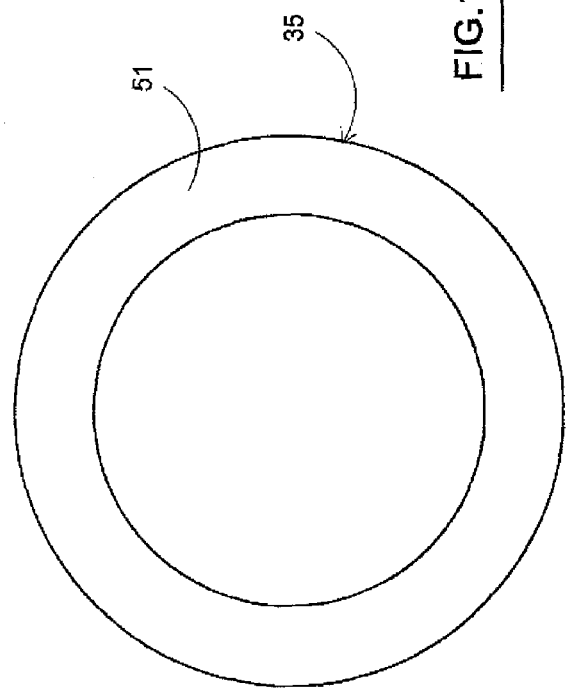
FIG.1B
FIG.2

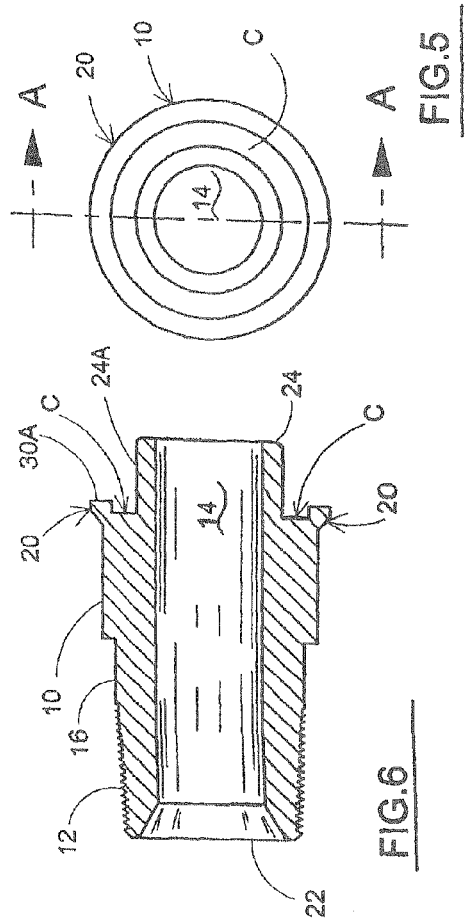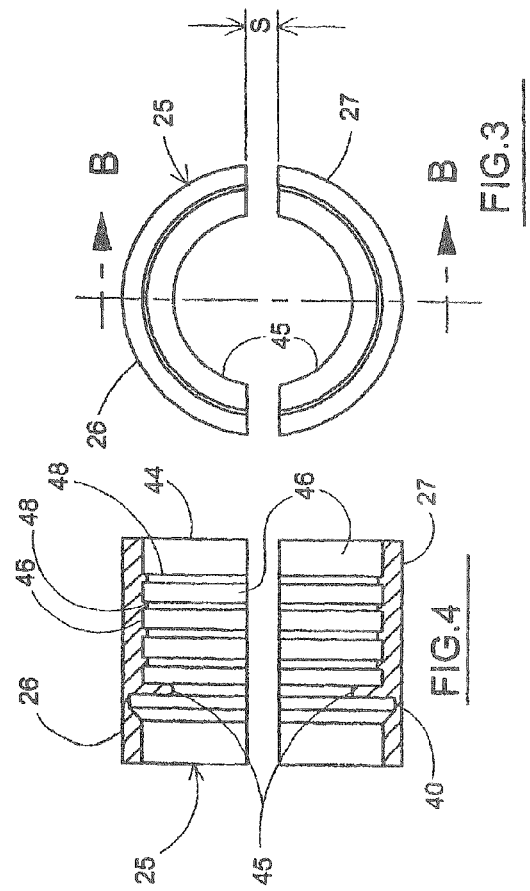

METAL HOSE END FITTING

FIELD OF THE INVENTION

The invention pertains to an end fitting assembly for a flexible metal hose. The invention further pertains to an end fitting assembly for a flexible metal hose wherein the hose is internally subject to high pressures and temperatures.

BACKGROUND OF THE INVENTION

Flexible corrugated hoses formed from metal tube are employed in many applications where the hose is exposed to severe conditions, such as internally high pressures or temperatures. Such hoses are also employed where the nature of the material conveyed through the hose requires the use of metal tubing. Typical uses of these hoses include applications where the hose is exposed to extreme hot and cold temperature conditions, where high pressure gas or liquid is transported through the hose, gas piping systems, refrigeration systems, or the movement of volatile chemicals through the hose.

With flexible corrugated hoses formed from metal tube, it is extremely important that the hoses be manufactured in a fluid tight manner or leak tight manner, particularly at locations where fittings are joined to the hose for coupling the hose to another hose or when coupling the hose to a fluid source or equipment. The assembly whereby the fittings are joined to the hose must also withstand the conditions of the hose itself, such as high pressures and pressure variation, extreme hot and cold temperatures, and the like, and during these conditions, not fail or leak.

SUMMARY OF THE INVENTION

A fitting assembly for attachment to a hose is provided. The fitting assembly for attachment to a hose assembly is provided generally in two parts. The first part includes a fitting which includes an interiorly disposed aperture, throughbore or bore extending between the ends of the fitting. The fitting is provided with a first end having external threads, or any other configuration to interface with a connecting pipe or other connector, and a second end with a smooth outer cylindrical surface adapted to receive the end portion of a hose end thereon. The bore is formed in the fitting and extends between the opposite ends. The corrugated hose typically has a stainless steel braiding around the exterior. The end portion of the hose, the last convolution, defines a flange with a fascia. The hose end is placed over the second end of the fitting. Intermediate the first end of the fitting and the second end of the fitting, but closer to the second end of the fitting, is an outwardly radial structure, an annular shoulder having on one side, the side adjacent the outer cylindrical end, an abutment surface for receiving the fascia of the hose end thereon, additionally the abutment surface houses a gasket there around within a gasket housing in the annular shoulder or raised male element which is integral with the outwardly radial structure. The end portion of the hose, the fascia of the hose, extends over the second end of the fitting all the way to the gasket.

The second part of the assembly includes a split clamshell, a two piece cylindrical sleeve, which surrounds a portion of the second end of the fitting, including the annular shoulder which houses the gasket there around. The split clamshell includes two pieces, an identical upper portion and lower portion. The split clamshell inside structure has a sleeve shoulder, a female mating structure, having a sleeve ramp surface and a sleeve abutment surface. The sleeve shoulder of the two piece cylindrical sleeve captures the annular shoulder of the fitting. Additionally, the split clamshell inside structure includes a radial root pressure ring, a series of radial grooves and a series of radial teeth. The sleeve abutment surface, of the sleeve shoulder, continues radially inward toward the bore, extending said surface to the root pressure ring. The hose end fascia is secured between the root pressure ring surface of the sleeve shoulder and the abutment surface of the annular shoulder and its gasket to form a pressure tight seal.

The corrugated hose has alternating crests and roots, the crest being the top element of the corrugation at the outer radial portion of the hose and the root being the bottom element of the corrugation the inner portion of the hose. The braided metal hose is cut so that a first corrugation is formed on the end. The first corrugation includes a first portion which is called the fascia. The fascia or "sealing face" is the wall portion of the first corrugation between approximately the top of the crest to approximately the bottom of the root. Any braid that remains on the first corrugation is removed. The distal portion of the hose end is placed about the second end of the fitting, bringing the first corrugation adjacent to the gasket. The split clamshell is then placed around the fitting and hose. This places the root pressure ring into the first corrugation root. The female mating structure of the clamshell captures the raised male element of the fitting. The radial root pressure ring is placed within the root of the first corrugation. This places the fascia of the first corrugation intermediate the gasket (on the fitting) and the root pressure ring (for both sides of the split clamshell). A portion of the braided metal hose is also surrounded by the clamshell. The braid wire and metal hose inter-fits into the series of radial grooves and teeth located inside the clamshell. A crimping collar or crimping ferrule is placed around the split clamshell outside portion.

When these parts are assembled as described above they are placed in a crimping machine, which works up to about 10,000 psi hydraulic pressure. The collar or ferrule is then submitted to radial compression crimping. This crimping takes place radially 360 degrees about the crimping collar. This positively seals the two piece cylindrical sleeve or split clamshell about the metal hose, fitting and gasket. The action of the crimping secures the fascia of the hose first corrugation intermediate the gasket and the clamshell radial root pressure ring. The radial crimping force causes both sides of the clamshell to come together, and thus the raised male element of the fitting slides into the indentation female element of the clamshell in the following fashion. The indentation female element has a 45 degree angle receiving face and the raised male element has a 45 degree angle projecting face. The 45 degree angle receiving face is forced downward and the 45 degree receiving face slides onto the 45 degree angle projecting face when it is crimped. At the same time, the gasket is compressed against the fascia of the first corrugation of the hose against the root pressure ring. The radial compression crimping forces the clamshell radially inward and axially toward the distal end of the fitting. The radial compression crimping closes gaps in the assembly and forms a pressure tight fit.

This process is repeatable and may be used on standard diameter hoses as well as special or critical application hoses. This process produces hose fittings which are pressure tight and have a temperature capability range from above −459 degrees Fahrenheit to 1200 degrees Fahrenheit (1200 F).

The invention will be best understood and become more apparent by referring to the drawing figures.

BRIEF DESCRIPTION OF THE DRAWINGS

FIG. 1B is a front view of the distal end of hose 35 at corrugation 50.

FIG. 2 is a fragmentary cross sectional view of the hose end fitting of the present invention after crimping.

FIG. 3 is an end view of the split clamshell of the hose end fitting showing the proximal end of the clamshell.

FIG. 4 is a view taken along line B-B of FIG. 3.

FIG. 5 is an end view of the fitting portion of the hose end fitting showing the proximal end of the fitting portion.

FIG. 6 is a view taken along line A-A of FIG. 5.

DETAILED DESCRIPTION OF THE PREFERRED EMBODIMENT

Figure 1:
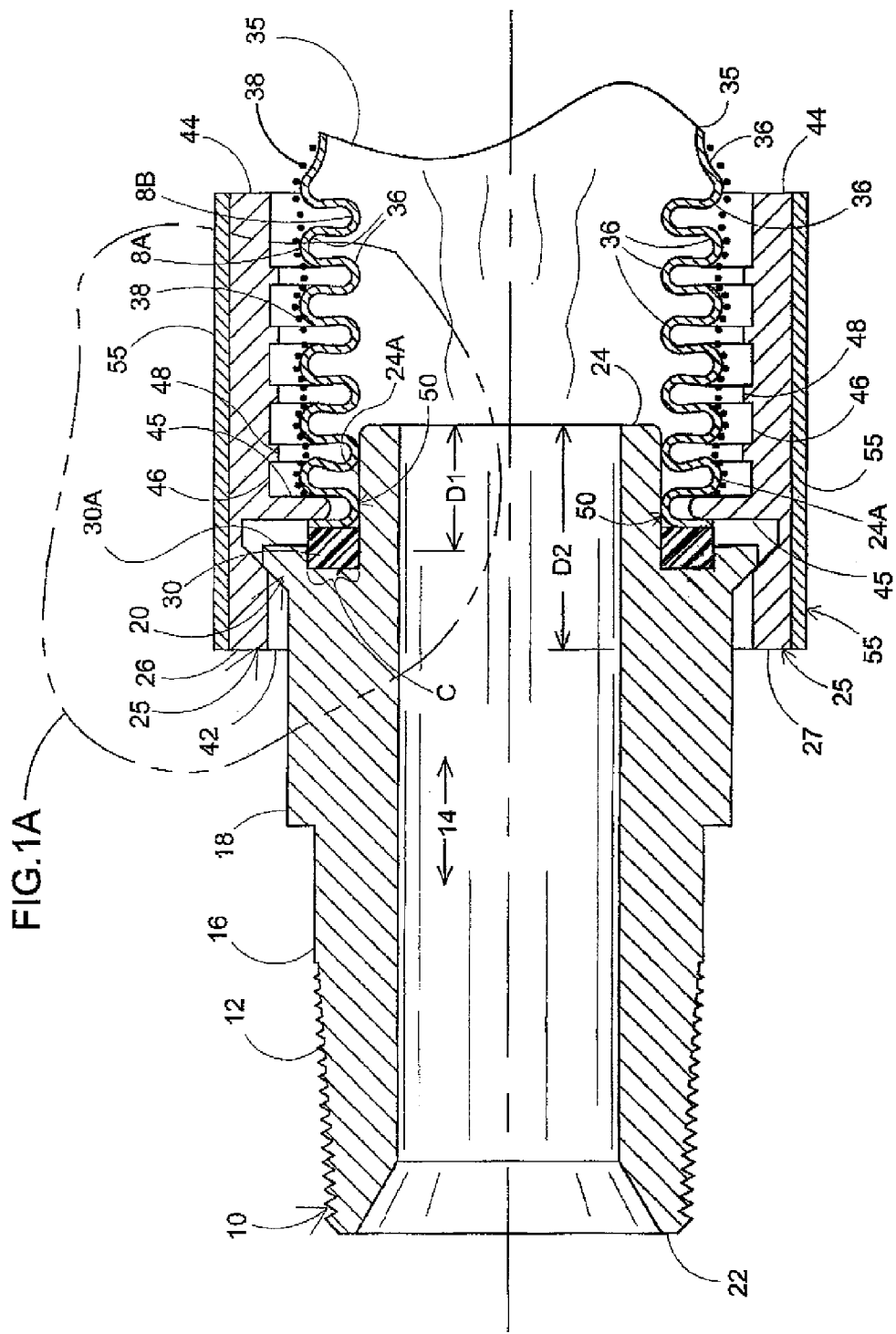
FIG. 1 is a fragmentary cross sectional view of the hose end fitting of the present invention prior to crimping.

Referring now to FIG. 1, the fitting assembly includes a fitting 10 shown having a first engagement end 22 and a second engagement end 24. Threading 12 (or any other configuration to interface with a connecting pipe) is provided on the outside of the first engagement end 22. Flat portion 16 is a clearance for a mating nut which would screw onto the fitting. Flat portion 18 is a physical limit stop for the split clamshell 25.

A bore or throughbore 14 passes through the fitting 10 from the first engagement end 22 to the second engagement end 24 for passage of media. Such media could include but not be limited to fluids, gases and/or particulates, such terms being used interchangeably herein. The first engagement end 22 may be referred to as the distal end of the fitting. The second engagement end 24 may be referred to as the proximal end of the fitting.

An annular shoulder raised portion 20 is shown at about first distance D1 from the second engagement end 24. The outer portion of the fitting from the second engagement end 24 to the raised portion 20 is the cylindrical annular insertion end 24A of the fitting 10. The raised shoulder portion 20 includes an abutment surface or engaging face 30A facing rearwardly in the direction of the engagement end 24 and perpendicular to the axis of fitting 10. A gasket housing cutout C is provided within raised portion 20 and forms a part of engaging face 30A. The cutout C, a gland cut out into raised portion 20 contains and supports an O-ring or gasket 30 therein. Cutout C is rectangular in shape, but could be of another shape, depending on the shape of gasket 30.

The gasket 30 preferably has a rectangular cross section but may be circular or any other shape as well, and is preferably made from graphite. However, the gasket 30 composition may change with the temperature, pressure, material or media being passed through the hose end fitting. These may include, but are not limited to, elastomeric materials, flouroelastomers, EPDM (Ethylene Propylene Diene Monomer), rubbers and asbestos. Gasket 30 forms a robust seal to prevent any gas or fluid from escaping the fitting assembly.

A metal hose 35 is provided with a convolution geometry 36. The convolution geometry 36 of the metal hose 35 causes a series of corrugations which include crests 8A and roots 8B. The metal hose 35 as known in the art, is provided with metal braid 38 surrounding the exterior cylindrical surface area of the metal hose 35. The metal hose 35 may be comprised of steel, stainless steel, carbon steel, a nickel copper alloy such as Monel™ a trademark of Huntington Alloys, Huntington W. Va. and/or INCO Alloys International, Toronto, Canada, an austenitic nickel-chromium-based superalloy such as Inconel™ a trademark of Special Metals Corporation, New Hartford, N.Y., or other metal materials. Likewise, the material forming braiding 38 can be of similar materials as the metal hose 35.

A two piece cylindrical sleeve or split clamshell 25 is adapted to interface with a portion of the fitting 10. The split clamshell 25 includes an upper portion 26 and a lower portion 27 which are identical. The clamshell 25 upper portion 26 and lower portion 27 include identical distal end 42 and proximal end 44.

The split clamshell 25 upper portion 26 and lower portion 27 surrounds the fitting 10 second engagement end 24 to about a distance D2.

Referring specifically to the split clamshell 25 inside structure a root pressure ring 45 is provided. The root pressure ring 45 is a flange which will engage the end of hose 35 at the first corrugation 50. From the root pressure ring 45 to the proximal end 44 of the split clamshell 25 are a series of grooves 46 and teeth 48 which are part of the clamshell 25. Adjacent the root pressure ring 45 toward the proximal end 44 of the clamshell 25 is a first groove 46. Adjacent the first groove 46 and toward the proximal end 44 is a first tooth 48. The grooves 46 and the teeth 48 alternate and grip the hose 35 and braid 38.

The corrugated hose 35 has a first corrugation 50. A U-shaped root pressure ring 45 is adapted to fit in first corrugation 50. The first corrugation 50 includes a fascia 51 and a corrugation root 8B which fits on the root of the root pressure ring 45. When the clamshell 25 upper portion 26 and lower portion 27 are placed atop the metal hose 35 and second engagement end 24 of the fitting 10, the fascia 51 of hose 35 is intermediate engaging face 30A with the gasket 30 and the root pressure ring 45 of clamshell 25 to form a seal when the fitting assembly is compressed or crimped.

The annular insertion end 24A is adjacent the interior of the corrugated hose 35. When the fitting assembly is compressed or crimped, the root pressure ring 45 forces the root 8B of the first corrugation 50 to form a seal against the outer portion of the annular insertion end 24A.

A crimping ferrule 55 fits over the mated clamshell 25 upper portion 26 and lower portion 27 in a sliding fashion.

Figure 1A:
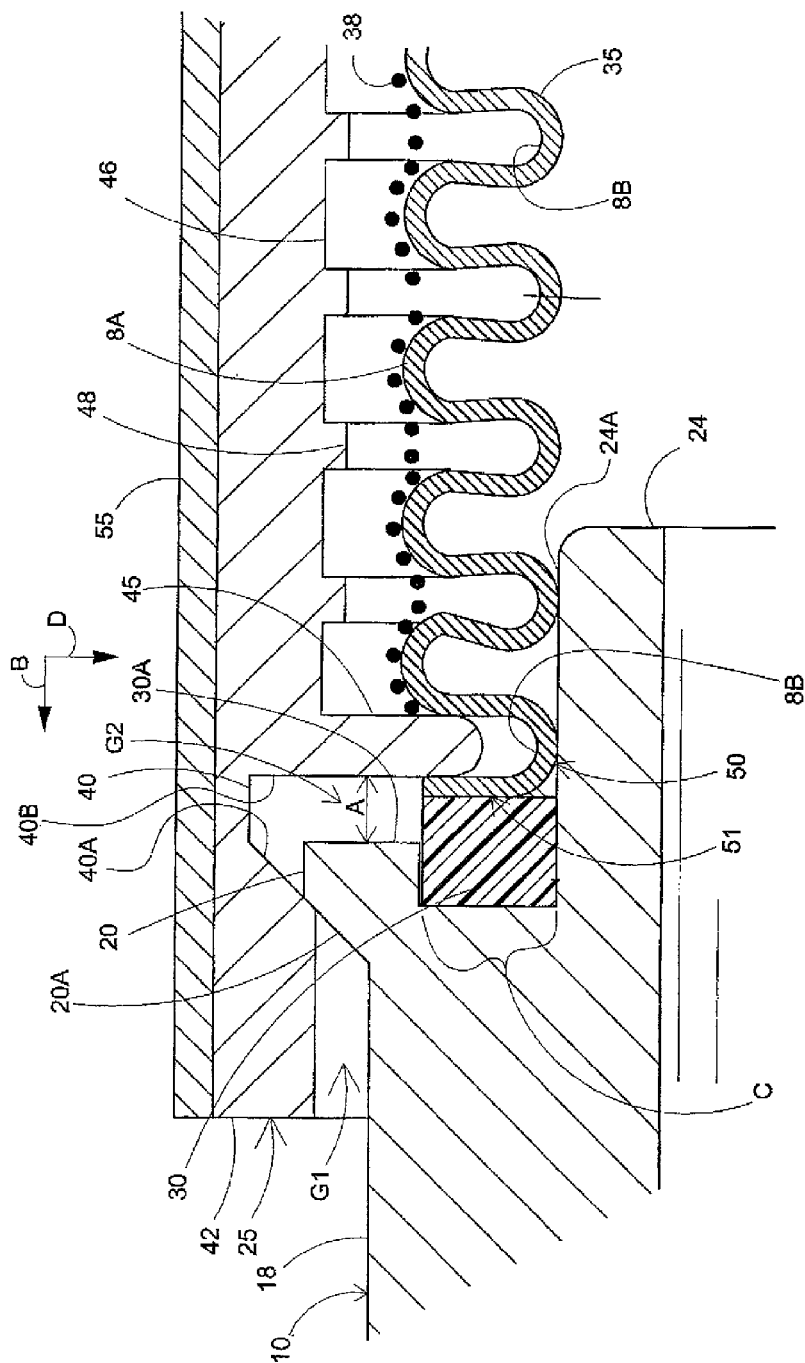
FIG. 1A is an enlarged view taken from FIG. 1 showing a close-up of the fitting, the gasket, the first corrugation and fascia, the clamshell and the crimping ferrule prior to crimping.

When the hose 35, fitting 10, clamshell's 25 upper portion 26 and lower portion 27, and crimping ferrule 55 are assembled (prior to crimping) a first gap G1 and a second gap G2 are formed. These gaps G1 and G2 are circular gaps about the fitting 10, as seen in FIG. 1A.

Referring now specifically to FIG. 2 a fragmentary cross sectional view of the hose end fitting assembly of the present invention is shown after crimping. FIG. 2 shows the upper half of the metal hose end fitting. The lower half (not shown) is identical. In FIG. 2, there are no new parts, however, the configuration of the crimping ferrule 55, clamshell 25, flat gasket 30, convolution geometry 36, first corrugation 50, and other parts have changed relative positions due to the crimping operation.

The crimping ferrule 55 has been submitted to radial compression crimping. This crimping takes place radially 360 degrees about the crimping ferrule 55. This positively seals the hose assembly by compressing the split clamshell 25 upper portion 26 to lower portion 27. Additionally the hose 35 fits between the series of crests 8A and roots 8B by the high pressure crimping. It further pinches, that is causes the clamshell 25 to lock onto the fitting 10, compressing the gasket 30.

Gasket 30 is mechanically compressed or squeezed between the clamshell 25 and the fitting 10 with fascia 51 secured between to close or prevent any fluid passage or leak from where the end of the hose 35 is attached to the fitting 10. This secures the fascia 51 of the first corrugation 50 of the metal hose 35 intermediate the now compressed gasket 30 and root pressure ring 45. The raised portion 20 of the fitting 10 moves and slides into the second gap G2, substantially eliminating the second gap area. Additionally, the crimping action moves the distal end 42 of the clamshell 25 upper portion 26 and lower portion 27 to preferably contact the clamshell limit stop 18, substantially eliminating the first gap G1 area. The clamshell's 25 upper portion 26 comes into direct contact with the lower portion 27 substantially eliminating the split distance "S" shown in FIG. 3, of the split clamshell 25 upper portion 26 and lower portion 27. The metal braid 38 and the convolution geometry 36 of the metal hose 35 are integrated into the grooves 46 and teeth 48.

Figure 2A:
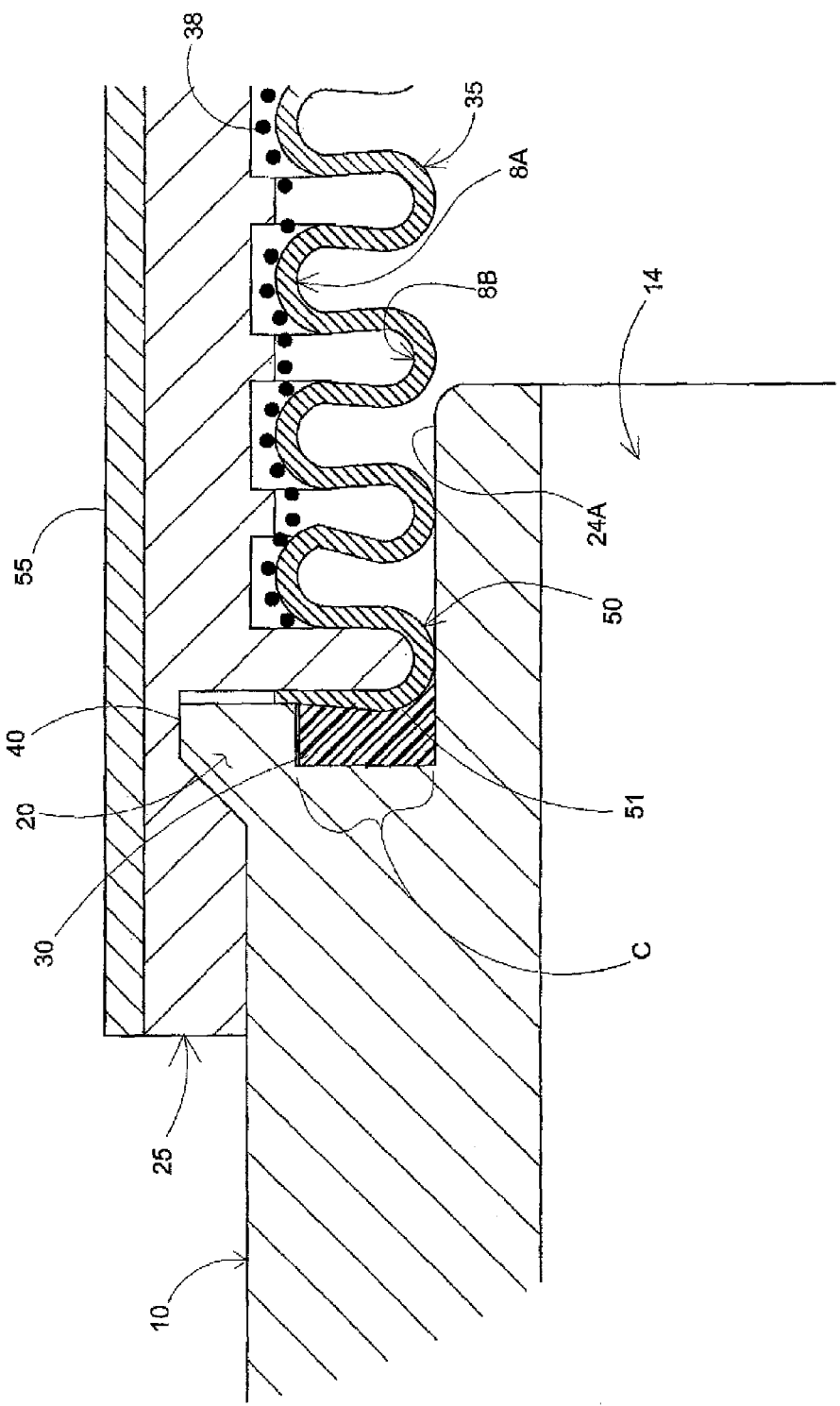
FIG. 2A is an enlarged view taken from FIG. 2 showing a close-up of the fitting, the gasket, the first corrugation and fascia, the clamshell and the crimping ferrule after crimping.

FIGS. 1A and 2A provide close-up partial cutaway views of the main points of engagement of the elements of the hose end fitting assembly. FIG. 1A shows the arrangement of the components of the hose end fitting assembly prior to crimping and FIG. 2A shows the arrangement after the crimping.

The metal hose 35 has a series of corrugations and is placed around and fits on the annular insertion end 24A of the fitting 10. This connects the metal hose 35 to the throughbore 14 of the fitting 10 for flow of fluids and/or gases. The gasket 30 is located in the gasket housing C within shoulder or raised portion 20. The clamshell 25 is placed atop the fitting 10 and hose 35. On the fitting 10, raised portion 20 includes a 45 degree angle projecting fitting ramp surface face 20A. Adjacent the 45 degree projecting face 20A (best seen in FIG. 1A) is the first gap G1. Above the raised portion 20 in the two piece cylindrical sleeve or clamshell 25 is a mating sleeve shoulder indentation 40. The mating indentation includes a 45 degree angle sleeve ramp surface receiving face 40A and a sleeve abutment surface 40B. Intermediate the raised portion 20 and the mating indentation 40 is the second gap G2. The axial distance between fitting 10 and clamshell 25 is G2 and shown by letter A in FIG. 1A. It has been contemplated that the projecting face 20A and the receiving face 40A may be of a different angle than 45 degrees. The projecting face 20A may be 60 degrees and the receiving face 40A may be 30 degrees. Alternatively, the projecting face 20A may be 30 degrees and the receiving face 40A may be 60 degrees. The sum of the angles of the projecting face 20A and the angle of the receiving face 40A is chosen to be 90 (ninety) degrees.

Surrounding the profile of the root pressure ring 45 is a first corrugation 50 of the metal hose 35 which has been debraided of metal braid 38 in this area. The first corrugation 50 includes a fascia 51. The fascia 51 is intermediate the gasket 30 and the root pressure ring 45.

About the clamshell 25 is the crimping ferrule 55. The fitting assembly is taken to a crimping machine where the crimping ferrule 55 is crimped at a very high radial crimping pressure, which when complete, gives the pressure tight seal of the metal hose 35 to the fitting 10. This is accomplished in part by indentation 40 being both axially and downwardly fit onto raised portion 20. The indentation 45 degree angle receiving face 40A, during crimping slides over the raised projection 45 degree angle projecting face 20A. This substantially closes the gaps G1 and G2. The motion is shown by arrows B and D where arrow B is in the axial direction toward distal end 22 and arrow D is in the radial direction toward the center line of throughbore 14, with the 45 degree sliding of the indention receiving face 40A over the 45 degree angle projecting face and additionally the motion of the clamshell 25 towards the distal end 22 of the fitting 10 (see FIGS. 1 & 2). The fascia 51 of the first convolution 50 is compressed between the gasket 30 and the root pressure ring 45 forming a first sealing area. Further, when the assembly is compressed the root pressure ring 45 forces the root 8B of the first corrugation 50 to form another sealing area against the outer portion of the annular insertion end 24A. The corrugations of the metal hose 35 which is covered with metal braid 38 is also compressed into the series of grooves 46 and teeth elements 48 forming a further gripping surface. This final assembly can withstand high pressures and temperatures and very securely affixes the metal hose 35 to the fitting 10.

FIGS. 3 and 4 are directed to the clamshell 25 element. FIG. 3 is an end view of the split clamshell 25 as seen from proximal end 44. FIG. 4 is a view taken along line B-B of FIG. 3. The top portion 26 and the bottom portion 27 of the clamshell 25 are identical both internally and externally. Additionally, the two parts may be interchangeable. The split distance S which separate the split clamshell 25 designates the approximate distance the top portion 26 and the bottom portion 27 are separated from each other when placed about the fitting 10 during assembly. When compressed the two halves come together the distance S is negligible if at all.

A series of teeth 48 and grooves 46 alternate on the interior of the clamshell 25 until the first convolution groove 46 abuts the root pressure ring 45. The alternating nature of the grooves 46 and the teeth 48 may be seen in FIG. 4. A tooth 48 is a thin raised portion which has a rectangular cross section. The grooves 46 are also rectangular in cross section are recessed, but are wider than the teeth 48. The grooves are cut outwardly and radially into the clamshell 25 as opposed to the teeth 48 which project both radially and inwardly. When compressed in a crimping machine the teeth 48 bite into portions of metal braid 38, and portions of metal hose 35 would be urged into the grooves 46. The root pressure ring 45 is adapted to receive the first debraided corrugation 50 of the metal hose 35 thereon.

Referring to indentation 40, the sleeve shoulder, as seen in FIGS. 1A and 2A. When the clamshell 25 is placed about the fitting during the assembly, the raised portion 20, the shoulder, of the fitting 10 is placed in close relation to indentation 40. After crimping, the indention 40 is press fit onto raised portion 20 and forms part of the pressure tight seal between the fitting 10 and the metal hose 35.

FIGS. 5 and 6 are directed to the fitting 10 element. FIG. 5 is an end view of the fitting 10 as seen from the second engagement end 24. FIG. 6 is a view taken along line A-A of FIG. 5. The center area is the throughbore 14 of the fitting 10. Surrounding the throughbore 14 is the second engagement end 24, and the annular insertion end 24A of the fitting 10 is configured to receive and fit within the open end of the metal hose 35. As seen in FIG. 6, raised portion 20 includes an engaging face 30A on the proximal side of raised portion 20. The engaging face 30A includes a flat wall abutment surface portion and cutout C. Though not shown, engaging face 30A may not include a cutout C, in such example, gasket 30 would preferably abut face 30A at the corner of face 30A and insertion end 24A. Likewise cutout C, a gland, can be of any shape to support gasket 30.

The gasket receiving cutout C receives gasket 30. Cutout C is within the raised portion 20. The gasket receiving cutout C would have a gasket 30 (see FIGS. 1 and 2) placed therein. The raised portion 20 will inter-fit with element 40 of the clamshell 25 prior to crimping. Raised portion 20 is shown at about first distance D1 from the second engagement end 24.

Threading 12 (or any other configuration to interface with a connecting pipe) is provided on the outside of the first engagement end 22. Flat portion 16 is a clearance for a mating nut which would screw onto the fitting 10. Flat portion 18 is a physical limit stop for the split clamshell 25 The throughbore 14 forms a continuous fluid line with the metal hose 35.

Figure 7:
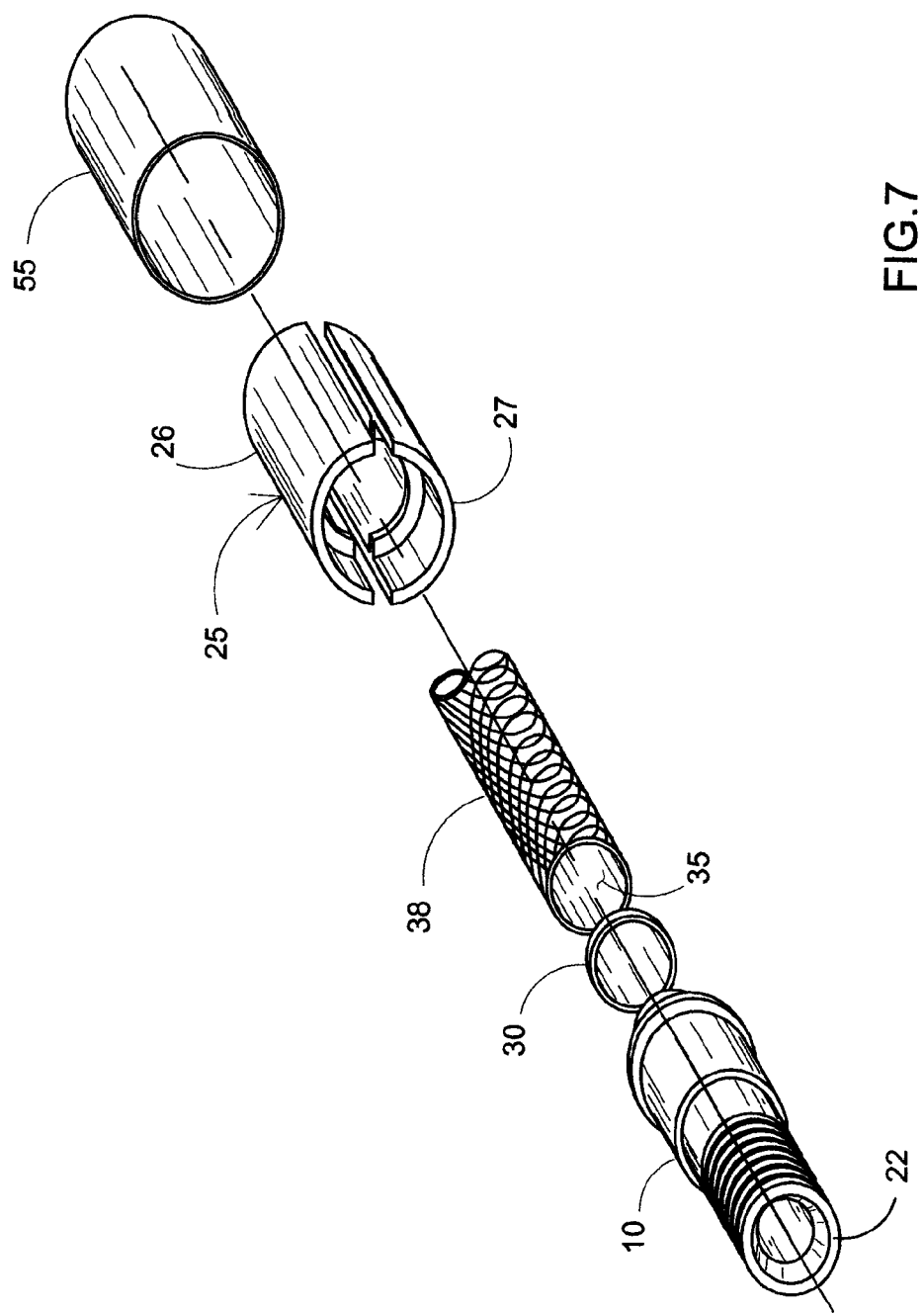
FIG. 7 is an exploded view of the hose end fitting of the present invention showing the relative arrangement of the components.

FIG. 7 is an exploded view of the fitting assembly of the present invention showing the arrangement of the components involved in the assembly. Fitting 10 has gasket 30 placed in the gasket housing C within the raised portion 20. Metal hose 35 is placed over the second engagement end 24 of the fitting. The cut end of the metal hose 35 has a first convolution 50 which receives the root pressure ring 45 of the clamshell. The clamshell upper 26 and lower 27 portions are placed over the fitting 10, gasket 30, and hose 35. Raised portion 20 of the fitting 10 will inter-fit with the indentation 40 (best seen in FIGS. 1A and 2A) inside the clamshell 25. Crimping ferrule 55 slides over the clamshell 25. This is the assembly which would be placed in the crimping machine. The crimping machine applies a radial force about the entire crimping ferrule 55 causing the fitting 10, gasket 30, first corrugation 50, metal hose 35, and clamshell 25 to form a pressure tight fitting.

The present invention can further be described as a hose fitting assembly for connection to a corrugated hose. The end portion of the hose, the last convolution, defining a flange with a fascia. The assembly having a fitting having opposing ends, the fitting having a bore formed therein extending between the opposing ends, one of the ends having an outer cylindrical portion for receiving the hose end, the fitting having an annular shoulder adjacent the outer cylindrical portion, the annular shoulder having an abutment surface and a fitting ramp surface opposite the abutment surface. A two piece cylindrical sleeve, each piece of the sleeve having a respective sleeve shoulder and a sleeve ramp surface for engaging the fitting ramp surface. A collar surrounding the cylindrical sleeve, the collar retaining each piece of the cylindrical sleeve and forcing the sleeves against one another and forcing the sleeve ramp surfaces against the fitting ramp surface for securing the hose flange between the sleeve shoulders and the annular shoulder. The assembly further comprising a gasket disposed on the outer cylindrical portion at the annular shoulder. The assembly further having a recess formed in the annular shoulder for receiving the gasket.

The present invention can further be described as a method for connecting a hose fitting assembly to a hose end having a flange. The method includes providing a fitting having opposing ends and a bore extending between the opposing ends. One of the ends has an outer cylindrical portion for receiving the hose end. The fitting has an annular shoulder adjacent the outer cylindrical portion. The annular shoulder has an abutment surface and a fitting ramp surface opposite the abutment surface. The outer cylindrical portion is inserted into the hose end. A two piece cylindrical sleeve is provided, each one of the pieces of the sleeve has a respective sleeve shoulder and a sleeve ramp surface for engaging the fitting ramp surface and placing the cylindrical sleeve around hose end and the fitting so that the ramp surface and the fitting ramp surface are axially aligned for cooperation with one another. A collar is provided around the cylindrical sleeve. The collar is compressed for retaining each one of the pieces of the cylindrical sleeve and forces the sleeves against one another and consequently forces the sleeve ramp surfaces against the fitting ramp surface for securing the hose flange between the sleeve shoulders and the annular shoulder. Further that a gasket is provided and disposed on the outer cylindrical portion at the annular shoulder. Additionally, the annular shoulder is provided with a recess for receiving the gasket.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A hose coupling including a hose having a first end, said hose coupling comprising:
    a fitting having a first engaging end and a second engaging end,
    said fitting further having a throughbore extending from said first engaging end to said second engaging end,
    said second engaging end including an annular insertion end, said annular insertion end adapted to receive said hose first end,
    an annular raised portion adjacent to said annular insertion end, said annular raised portion having a cutout, said cutout located below said annular raised portion, said cutout being adjacent said annular insertion end,
    a gasket adapted to fit about said fitting and being seated in said cutout,
    said hose first end including a plurality of corrugations, with a first corrugation having a fascia,
    a clamshell having an identical first half and second half, both said first half and second half having an inside and an outside, said inside of said clamshell first half and second half including an indentation, said indentation depending radially and outwardly into said clamshell,
    a flange adjacent said indentation, said flange depending radially and inwardly from said clamshell, said clamshell first half and second half placed about said hose and said fitting, said indentation receiving said annular raised portion therein, said flange engaging said groove of said first corrugation of said hose, further placing said fascia intermediate said gasket and said flange,
    a collar slidingly placed over said clamshell first half and second half, whereby said collar is crimped about said clamshell, forcing said clamshell first half to said clamshell second half, moving said indentation both axially and radially onto said annular raised portion, and moving said flange into said first corrugation, sealing said fascia against said gasket and said flange in a pressure tight arrangement.

2. A hose coupling as claimed in claim 1 wherein said annular raised portion includes a 45 degree angle projecting face.

3. A hose coupling as claimed in claim 2 wherein said indentation includes a 45 degree angle depending face.

4. A hose coupling as claimed in claim 3 wherein when said crimping takes place said indentation 45 degree angle depending face engages said annular raised portion 45 degree angle projecting face causing said depending face to slide along said projecting face, further moving said clamshell both radially and axially until said indentation is substantially press fit about said annular raised portion.

5. A hose coupling as claimed in claim 4 wherein said hose is circular and comprised of a metal surrounded by a metal braid.

6. A hose coupling as claimed in claim 5 wherein said metal braid is removed from said first corrugation, whereby said fascia and said first corrugation are metal braid free.

7. A hose end coupling as claimed in claim 1 wherein outside portions of said clamshell first half and second half are each half circles, and when crimped form a substantially single circular clamshell.

8. A hose coupling as claimed in claim 1 wherein said annular raised portion includes a projecting face having a first angle.

9. A hose coupling as claimed in claim 8 wherein said indentation includes a depending face having a second angle.

10. A hose coupling as claimed in claim 9 wherein said first angle is chosen to be in the range of thirty to sixty degrees, and said second angle is chosen to be in the range of thirty to sixty degrees, where the sum of said first angle and said second angle is ninety degrees.

* * * * *